US011881066B2

(12) United States Patent
Ross et al.

(10) Patent No.: US 11,881,066 B2
(45) Date of Patent: Jan. 23, 2024

(54) DOOR POSITION SENSING SYSTEM WITH REDUCTION OF NOISE GENERATED BY DYNAMIC FERROMAGNETIC COMPONENTS

(71) Applicant: Schlage Lock Company LLC, Carmel, IN (US)

(72) Inventors: Mark A. Ross, Federal Heights, CO (US); Nicholas Long, Aurora, CO (US)

(73) Assignee: Schlage Lock Company LLC, Carmel, IN (US)

( * ) Notice: Subject to any disclaimer, the term of this patent is extended or adjusted under 35 U.S.C. 154(b) by 822 days.

(21) Appl. No.: 17/000,667

(22) Filed: Aug. 24, 2020

(65) Prior Publication Data

US 2022/0058904 A1 Feb. 24, 2022

(51) Int. Cl.
*E05B 47/00* (2006.01)
*E05B 45/06* (2006.01)
*G07C 9/00* (2020.01)

(52) U.S. Cl.
CPC .......... *G07C 9/00722* (2013.01); *E05B 45/06* (2013.01); *E05B 47/0038* (2013.01); *E05B 47/0046* (2013.01); *E05B 2045/0665* (2013.01); *E05B 2047/0068* (2013.01); *E05Y 2201/462* (2013.01); *E05Y 2201/47* (2013.01); *E05Y 2400/322* (2013.01); *E05Y 2900/132* (2013.01)

(58) Field of Classification Search
CPC . G07C 9/00722; E05B 45/06; E05B 47/0038; E05B 47/0046; E05B 2045/0665; E05B 2047/0068; E05B 2047/0089; E05B 47/00; E05Y 2201/462; E05Y 2201/47; E05Y 2400/322; E05Y 2900/132; G08B 13/08
See application file for complete search history.

(56) References Cited

U.S. PATENT DOCUMENTS

| | | | | |
|---|---|---|---|---|
| 9,790,736 | B2 | 10/2017 | Kincaid et al. | |
| 9,982,459 | B2 | 5/2018 | Telljohann et al. | |
| 2017/0193724 | A1* | 7/2017 | Johnson | G07C 9/00309 |
| 2019/0211619 | A1* | 7/2019 | Kincaid | G08B 13/08 |
| 2020/0265662 | A1* | 8/2020 | Maiga | G07C 9/00174 |
| 2021/0324660 | A1* | 10/2021 | Maiga | E05B 15/102 |

FOREIGN PATENT DOCUMENTS

| | | | |
|---|---|---|---|
| EP | 3091335 A1 * | 11/2016 | G01C 17/38 |

* cited by examiner

*Primary Examiner* — Mohamad A Musleh
(74) *Attorney, Agent, or Firm* — Taft Stettinius & Hollister LLP

(57) ABSTRACT

An electronic lock device according to one embodiment includes a first magnetometer, a second magnetometer, a dynamic ferromagnetic component positioned between the first magnetometer and the second magnetometer, a processor, and a memory comprising a plurality of instructions stored thereon that, in response to execution by the processor, causes the electronic lock device to read sensor data from the first magnetometer and the second magnetometer, modify the sensor data to generate compensated sensor data that compensates for magnetic noise generated by the dynamic ferromagnetic component, and determine whether the door is in a closed state or an open state based on the compensated sensor data.

20 Claims, 5 Drawing Sheets

DOOR POSITION SENSING SYSTEM WITH REDUCTION OF NOISE GENERATED BY DYNAMIC FERROMAGNETIC COMPONENTS

BACKGROUND

Security systems can monitor the position of a door, gate, panel, or other access barrier (e.g., collectively "doors") relative to an associated entryway or structure. Such positional information may provide an indication as to whether the door is positioned to prohibit or allow ingress or egress into/from the associated entryway and/or structure. Certain types of monitoring systems use a reed switch and magnet, such that the reed switch changes between open and closed positions based on the location of the magnet. In some circumstances, a magnet may be mounted or otherwise embedded in a door, while the reed switch is mounted in a door frame, or vice versa. When the door, and thus the magnet embedded therein, comes within close proximity to the reed switch, the reed switch can be actuated. Conversely, the reed switch may be de-activated when the door, and thus the magnet, is positioned/moved away from the reed switch. The activation and de-activation of the reed switch may be monitored by an access control device.

SUMMARY

One embodiment is directed to a unique system, components, and methods for door position sensing with reduction of noise generated by dynamic ferromagnetic components. Other embodiments are directed to apparatuses, systems, devices, hardware, methods, and combinations thereof for door position sensing with reduction of noise generated by dynamic ferromagnetic components.

According to an embodiment, an electronic lock device adapted to be secured to a door may include a first magnetometer, a second magnetometer, a dynamic ferromagnetic component positioned between the first magnetometer and the second magnetometer, a processor, a memory comprising a plurality of instructions stored thereon that, in response to execution by the processor, causes the electronic lock device to read sensor data from the first magnetometer and the second magnetometer, modify the sensor data to generate compensated sensor data that compensates for magnetic noise generated by the dynamic ferromagnetic component, and determine whether the door is in a closed state or an open state based on the compensated sensor data.

In some embodiments, the dynamic ferromagnetic component may be positioned between the first magnetometer and the second magnetometer in a first dimension, and the first magnetometer may be adapted to be positioned between a permanent magnet secured to a door frame and the dynamic ferromagnetic component.

In some embodiments, the dynamic ferromagnetic component may be adapted to rotate relative to the first dimension.

In some embodiments, the dynamic ferromagnetic component may be positioned between the first magnetometer and the second magnetometer along an axis.

In some embodiments, the dynamic ferromagnetic component may include at least one component of a spring cage.

In some embodiments, the plurality of instructions may further cause the electronic lock device to determine calibrated sensor data values based on reference data and the sensor data read from the first magnetometer and the second magnetometer, and to modify the sensor data to generate the compensated sensor data may include to generate the compensated sensor data based on the calibrated sensor data values.

In some embodiments, to determine the calibrated sensor data values may include to determine a difference between the reference data and the corresponding sensor data read from the first magnetometer and the second magnetometer.

In some embodiments, to generate the compensated sensor data may include to determine a difference between the calibrated sensor data values.

In some embodiments, to determine whether the door is in the closed state or the open state may include to determine whether the door is in the closed state or the open stated based on the compensated sensor data and at least one system threshold.

In some embodiments, the at least one system threshold may be based on electromagnetic properties of at least one component of the electronic lock device.

In some embodiments, the plurality of instructions may further cause the electronic lock device to generate an alert message in response to a determination that the door is in the open state.

According to another embodiment, an access control system includes a permanent magnet positioned at a door frame and structured to generate a first magnetic field, and an access control device configured to determine whether the door is in an open state or a closed state based on the first magnetic field sensed by the access control device, wherein the access control device includes a mechanical component having dynamic motion and adapted to generate a second magnetic field as a result of the dynamic motion, a first sensor configured to sense magnetic fields within a vicinity of the first sensor and positioned between the permanent magnet and the mechanical component in a first dimension, and a second sensor configured to sense magnetic fields within a vicinity of the second sensor, and the mechanical component is positioned between the first sensor and the second sensor in the first dimension.

In some embodiments, the first sensor may be a first distance from the permanent magnet in the first dimension, the mechanical component may be a second distance from the permanent magnet in the first dimension, the second sensor may be a third distance from the permanent magnet in the first dimension, the second distance may be greater than the first distance, and the third distance may be greater than the second distance.

In some embodiments, the first sensor, the second sensor, and the mechanical component may be positioned along an axis.

In some embodiments, each of the first sensor and the second sensor may include a magnetometer.

In some embodiments, the mechanical component may be adapted to rotate relative to the first dimension.

In some embodiments, the access control device may include an electronic lock device, and the mechanical component may include a spring cage of the electronic lock device.

In some embodiments, to determine whether the door is in the open state or the closed state based on the first magnetic field sensed by the access control device may include to compensate for the second magnetic field generated by the mechanical component.

In some embodiments, the access control device may include a printed circuit board assembly, and each of the first sensor and the second sensor may be secured to the printed circuit board assembly.

In some embodiments, the access control system may further include a strike plate, and the permanent magnet may be one of secured to or integrally formed with the strike plate.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
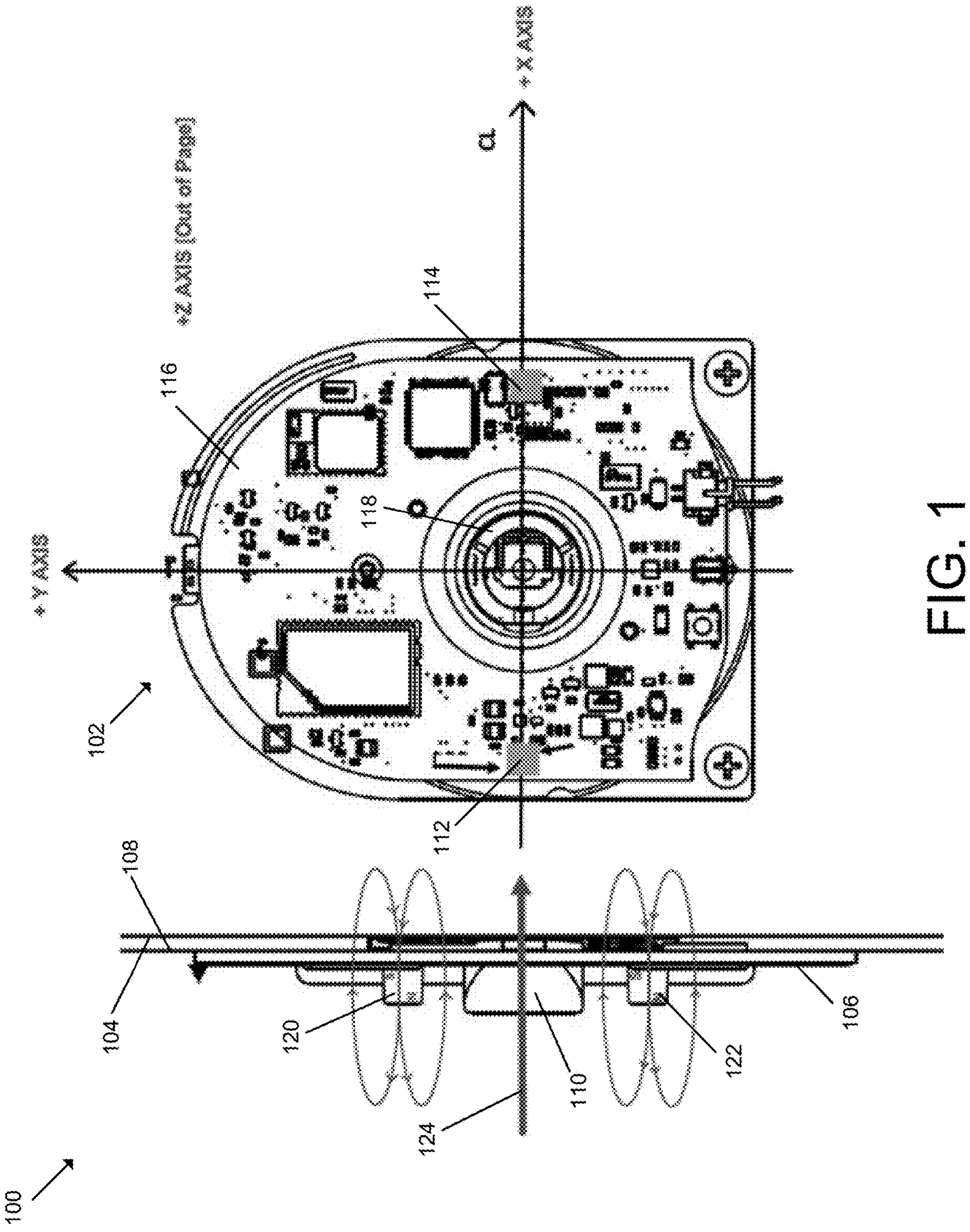
FIG. 1 is a simplified block diagram of at least one embodiment of a system for door position sensing with reduction of noise generated by dynamic ferromagnetic components.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

It should be appreciated that the use of magnetic sensors in electro-mechanical access control devices (e.g., lock devices), can create a potential environment in which magnetic noise can interfere with a magnetometer's reading (e.g., of a rare earth magnet or other type of permanent magnet positioned in a door frame). For example, the existence of ferromagnetic components in the mechanical subsystems of the access control device (e.g., mechanical subsystems configured to rotate or otherwise have dynamic movements) may induce stray magnetic fields (magnetic noise) due to material properties and manufacturing processes. In turn, these stray field, can render a single magnetometer door position sensing (DPS) system inoperable, which may cause the system to report inaccurate readings and alerts with respect to door position. The techniques described herein allow for the cancellation of such noise within the sensing system.

Referring now to FIG. 1, in the illustrative embodiment, a door position sensing system 100 with reduction of noise generated, for example, by dynamic ferromagnetic components is shown. The illustrative system 100 depicts an access control device 102 secured to a door 104 and a strike plate 106 secured to a door frame 108 while the door 104 is in a closed position such that a latch 110 of the access control device 102 extends through an aperture defined in the strike plate 106. It should be appreciated that the access control device 102 is configured to move away from the strike plate 106 as door 104 is opened.

The illustrative access control device 102 is depicted with an outer escutcheon removed, which exposes various circuitry and components within the access control device 102. For example, in the illustrative embodiment, the access control device 102 includes two magnetometers 112, 114, which are secured to a printed circuit board assembly 116 of the access control device 102 (e.g., along with a processor, memory, and/or other circuitry). In the illustrative embodiment, the magnetometers 112, 114 are positioned on either side of a spring cage 118 along an axis. It should be appreciated that the spring cage 118 is designed to mechanically couple to a knob, lever, or other adjustment mechanism and also mechanically coupled (e.g., via a linkage) to the latch 110, such that when the knob or lever is turned, the spring cage 118 rotates and causes the latch 110 to be retracted (e.g., from the aperture in the strike plate 106).

As shown, the system 100 also includes two permanent magnets 120, 122 positioned at the door frame 108, which, as magnets, are designed to generate corresponding magnetic fields. In various embodiments, the magnets 120, 122 may be secured to the strike plate 106, integrally formed with the strike plate 106, or otherwise positioned at or nearby the strike plate 106. In the illustrative embodiment, the magnets 120, 122 are equally spaced (e.g., along a y-dimension) relative to the center of the aperture of the strike plate 106 such that a midpoint between the magnets 120, 122 coincides with the center of the aperture of the strike plate 106 and the latch 110 (i.e., when the door 104 is in the closed position with the latch 110 extended). As shown, the net magnetic flux 124 due to the magnets 120, 122 may be represented as a vector positioned in line with the latch 110 and/or the magnetometers 112, 114 and directed toward the magnetometers 112, 114 (e.g., along an x-axis).

Depending on the particular embodiment, the magnets 120, 122 may or may not be identical in material, shape, size, and/or electromagnetic properties. In some embodiments, one or both the magnets 120, 122 may be embodied as a rare earth magnet or other type of magnet with a magnetic field stronger than Earth's magnetic field. Although the illustrative embodiment includes two permanent magnets 120, 122, it should be appreciated that a different number of magnets may be used in different embodiments. Further, although the magnetometers 112, 114 are described herein as magnetometers specifically, it should be appreciated that one or both of the magnetometers 112, 114 may be embodied as another type of sensor configured to sense magnetic fields within the vicinity of the respective sensor in other embodiments.

It should be appreciated that the spring cage 118 may be formed of ferrous material, which can become magnetized during the manufacturing process. Accordingly, when the spring cage 118 is rotated to retract the latch 110 (without changing the position of the door 104 itself), the motion of the magnetized component can alter the magnetic field sensed by the magnetometers 112, 114 (e.g., changing the coordinates characterized as "home" or reference coordinates during calibration). When unaccounted for, the altered "coordinates" from the magnetized parts mimic that of the door 104 opening, which makes it difficult to distinguish between the door 104 opening and simply rotation of the spring cage 118 (and spindle), and the access control device 102 becomes vulnerable to false reporting of door position. Accordingly, the techniques described herein allow for the access control device 102 to cancel stray magnetism or magnetic fields from the spring case 118 (or other dynamic ferromagnetic parts).

It should be appreciated that the access control device 102 may be embodied as any type of device capable of controlling access through a passageway. For example, in some embodiments, the access control device 102 may be embodied as an electronic lock device (e.g., a mortise lock, a cylindrical lock, or a tubular lock), gate opener, exit device, or auto-operator of a passageway. Depending on the particular embodiment, the access control device 102 may include a credential reader or be electrically/communicatively coupled to a credential reader configured to receive access credentials. In some embodiments, the access control device 102 may be configured to manage access credentials that may be used to gain access through the passageway secured by the access control device 102. For example, the access control device 102 may store updated authorized credentials, whitelists, blacklists, device parameters, and/or other suitable data.

It should be appreciated that the access control device 102 may be embodied as and/or include components similar to a computing device/system similar to the computing system 300 described below in reference to FIG. 3. For example, in the illustrative embodiment, the access control device 102 may include a processing device 302 and a memory 306 having stored thereon operating logic 308 for execution by the processing device 302 for operation of the access control device 102 (e.g., to receive sensor data from the magnetometers 112, 114 and perform the various functions described herein).

Figure 2:
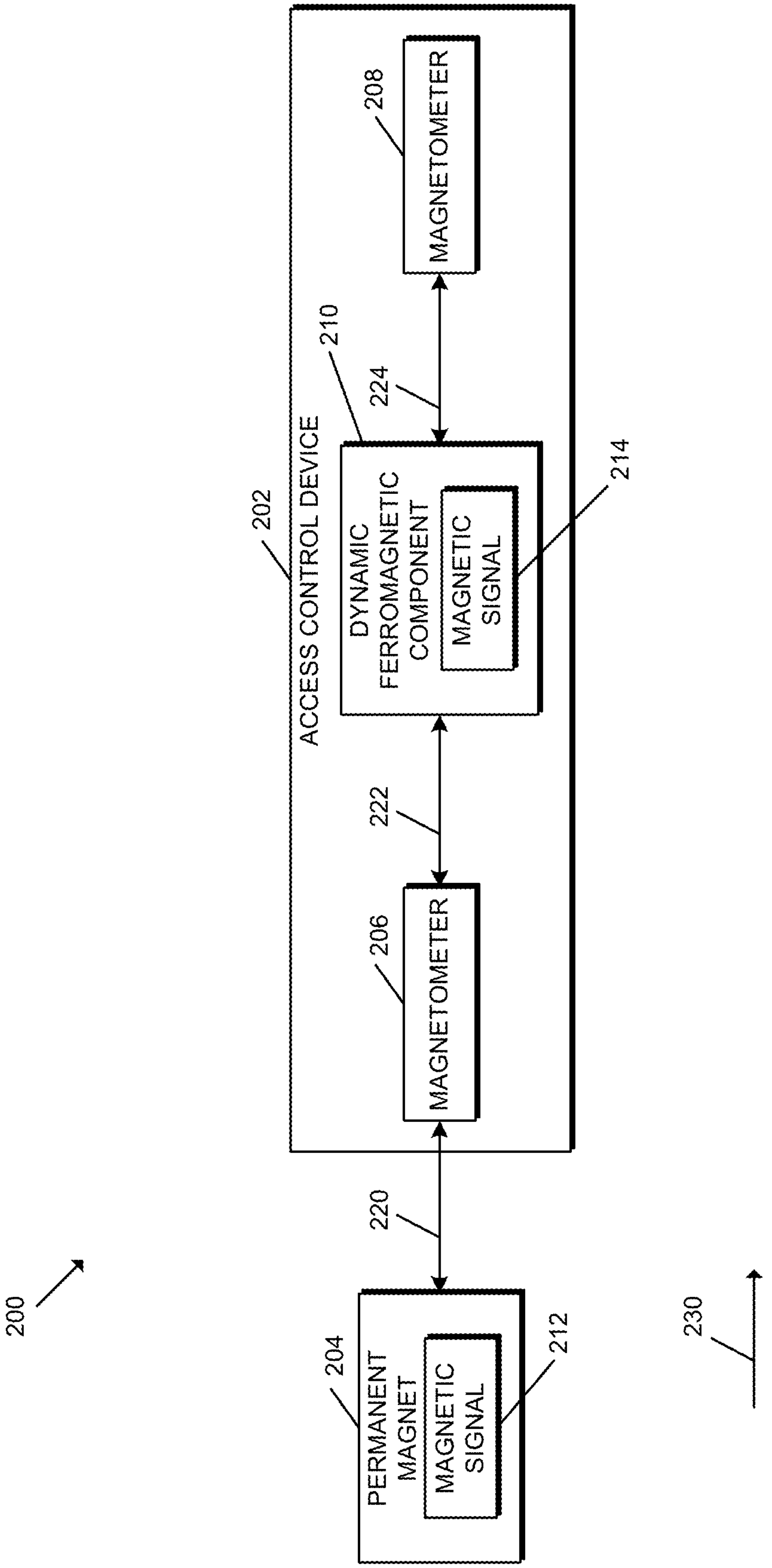
FIG. 2 is a simplified block diagram of at least one embodiment of a system for sensing a magnetic field with reduction of noise generated by dynamic ferromagnetic components.

Referring now to FIG. 2, in the illustrative embodiment, a system 200 for sensing a magnetic field with reduction of noise generated by dynamic ferromagnetic components is shown. It should be appreciated that, in some embodiments, the system 200 of FIG. 2 is embodied as a generalized system of the system 100 of FIG. 1. Accordingly, in some embodiments, the system 100 of FIG. 1 may be at least one embodiment of the system 200 of FIG. 2. As such, the descriptions of the various components of the system 100 of FIG. 1 may be equally applicable to various embodiments of the system 200 of FIG. 2, and the descriptions of those components have not been repeated herein in full for brevity of the disclosure.

The illustrative system 200 depicts an access control device 202 and a permanent magnet 204. Further, the access control device 202 includes magnetometers 206, 208 and at least one dynamic ferromagnetic component 210. The permanent magnet 204 is structured to generate a magnet signal/field 212 similar to that described above with respect to the system 100 of FIG. 1. In some embodiments, the permanent magnet 204 may be embodied as a rare earth magnet or other type of magnet with a magnetic field stronger than Earth's magnetic field. Although depicted and described in the singular, it should be appreciated that the system 200 may include multiple permanent magnets 204 in some embodiments.

The dynamic ferromagnetic component 210 is configured to generate a magnetic signal/field 214 in a manner similar to that described above with respect to the system 100 of FIG. 1. It should be appreciated that the dynamic ferromagnetic component 210 may be embodied as any type of mechanical component having dynamic motion and adapted to generate a magnetic signal/field 214 as a result of the dynamic motion (e.g., due to the mechanical component being magnetized). For example, in some embodiments, the dynamic ferromagnetic component 210 may be embodied as a spring cage or spindle of an electronic lock device.

Although the magnetometers 206, 208 are described herein as magnetometers specifically, it should be appreciated that one or both of the magnetometers 206, 208 may be embodied as another type of sensor configured to sense magnetic fields within the vicinity of the respective sensor in other embodiments.

As shown, in the illustrative embodiment of FIG. 2, the magnetometer 206 is positioned between the permanent magnet 204 and the dynamic ferromagnetic component 210 in a first dimension/direction 230, and the dynamic ferromagnetic component 210 is positioned between the magnetometer 206 and the magnetometer 208 in the same dimension/direction 230. More specifically, in the illustrative embodiment, the magnetometer 206 is a distance 220 from the permanent magnet 204 (e.g., along an axis), the dynamic ferromagnetic component 210 is a distance 222 from the magnetometer 206 (e.g., along the same axis), and the magnetometer 208 is a distance 224 from the dynamic ferromagnetic component 210 (e.g., along the same axis). Accordingly, it should be appreciated that the magnetometer 206 is a first distance from the permanent magnet 204, the dynamic ferromagnetic component 210 is a second distance from the permanent magnet 204 greater than the first distance, and the magnetometer 208 is a third distance from the permanent magnet 204 greater than the second distance. It should be further appreciated that, in some embodiments, the dynamic ferromagnetic component 210 may be configured to rotate or otherwise move transversely relative to the first dimension/direction 230 (e.g., relative to the above-referenced axis).

Although the permanent magnet 204, the magnetometer 206, the dynamic ferromagnetic component 210, and the magnetometer 208 are depicted as being along the same axis in FIG. 2, it should be appreciated that one or more of the permanent magnet 204, the magnetometer 206, the dynamic ferromagnetic component 210, and the magnetometer 208 may be offset relative to such an axis in some embodiments.

It should be appreciated that the access control device 202 may be embodied as and/or include components similar to a computing device/system similar to the computing system 300 described below in reference to FIG. 3. For example, in the illustrative embodiment, the access control device 202 may include a processing device 302 and a memory 306 having stored thereon operating logic 308 for execution by the processing device 302 for operation of the access control device 202 (e.g., to receive sensor data from the magnetometers 206, 208 and perform the various functions described herein).

Figure 3:
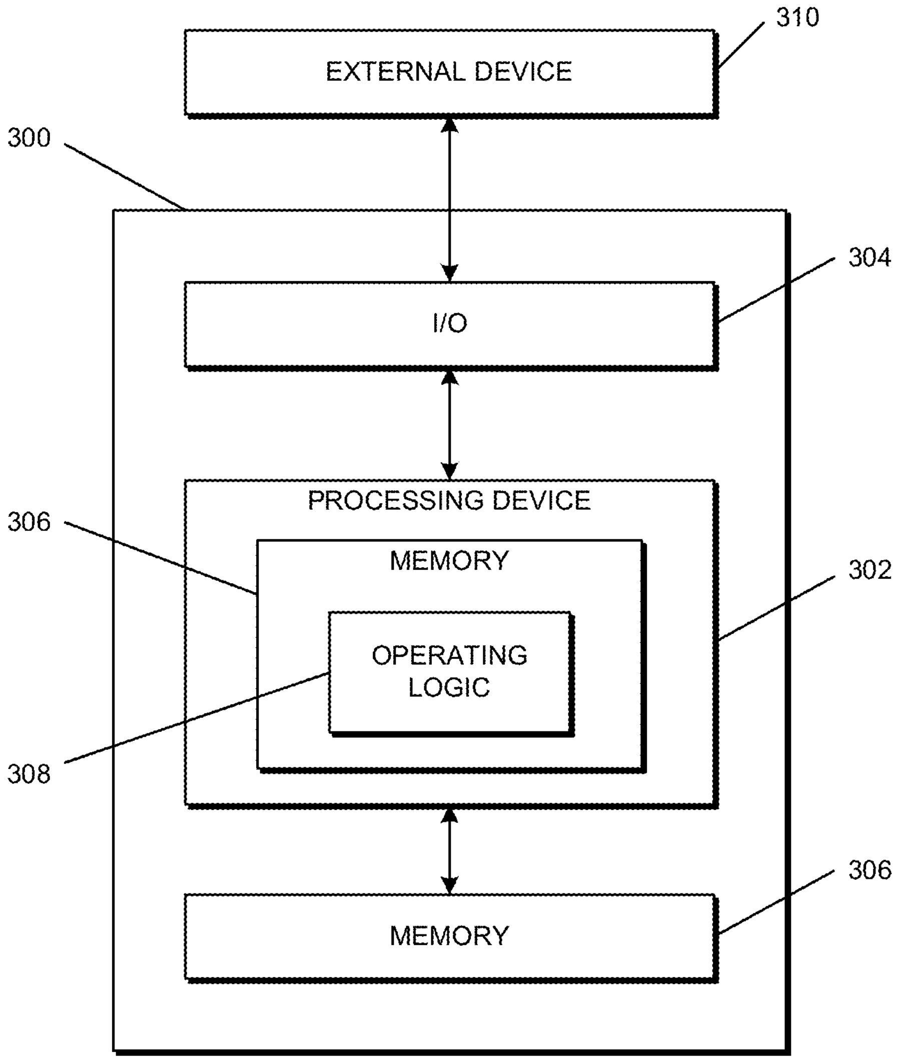
FIG. 3 is a simplified block diagram of at least one embodiment of a computing system.

Referring now to FIG. 3, a simplified block diagram of at least one embodiment of a computing system 300 is shown. The illustrative computing system 300 depicts at least one embodiment of a computing device/system that may be utilized in connection with the access control device 102 illustrated in FIG. 1 and/or the access control device 202 illustrated in FIG. 2. Depending on the particular embodiment, the computing system 300 may be embodied as an access control device and/or any other computing, processing, and/or communication device capable of performing the functions described herein.

The computing system 300 includes a processing device 302 that executes algorithms and/or processes data in accordance with operating logic 308, an input/output device 304 that enables communication between the computing system 300 and one or more external devices 310, and memory 306 which stores, for example, data received from the external device 310 via the input/output device 304.

The input/output device 304 allows the computing system 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, Ultra-Wide Band, etc.) to effect such communication depending on the particular computing device 300. The input/output device 304 may include hardware, software, and/or firmware suitable for performing the techniques described herein.

The external device 310 may be any type of device that allows data to be inputted or outputted from the computing system 300. In some embodiments, the external device 310 may be embodied as a computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing system 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is of a programmable variety that executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable variety, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing system 300 may form a portion of a system-on-a-chip (SoC) and be incorporated on a single integrated circuit chip.

In some embodiments, various components of the computing system 300 (e.g., the processing device 302 and the memory 306) may be communicatively coupled via an input/output subsystem, which may be embodied as circuitry and/or components to facilitate input/output operations with the processing device 302, the memory 306, and other components of the computing system 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing system 300 may include other or additional components, such as those commonly found in a typical computing device (e.g., various input/output devices and/or other components), in other embodiments. It should be further appreciated that one or more of the components of the computing system 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing system 300 may include multiple processing devices 302, I/O devices 304, and/or memories 306 in other embodiments. Further, in some embodiments, more than one external device 310 may be in communication with the computing system 300.

Figure 4:
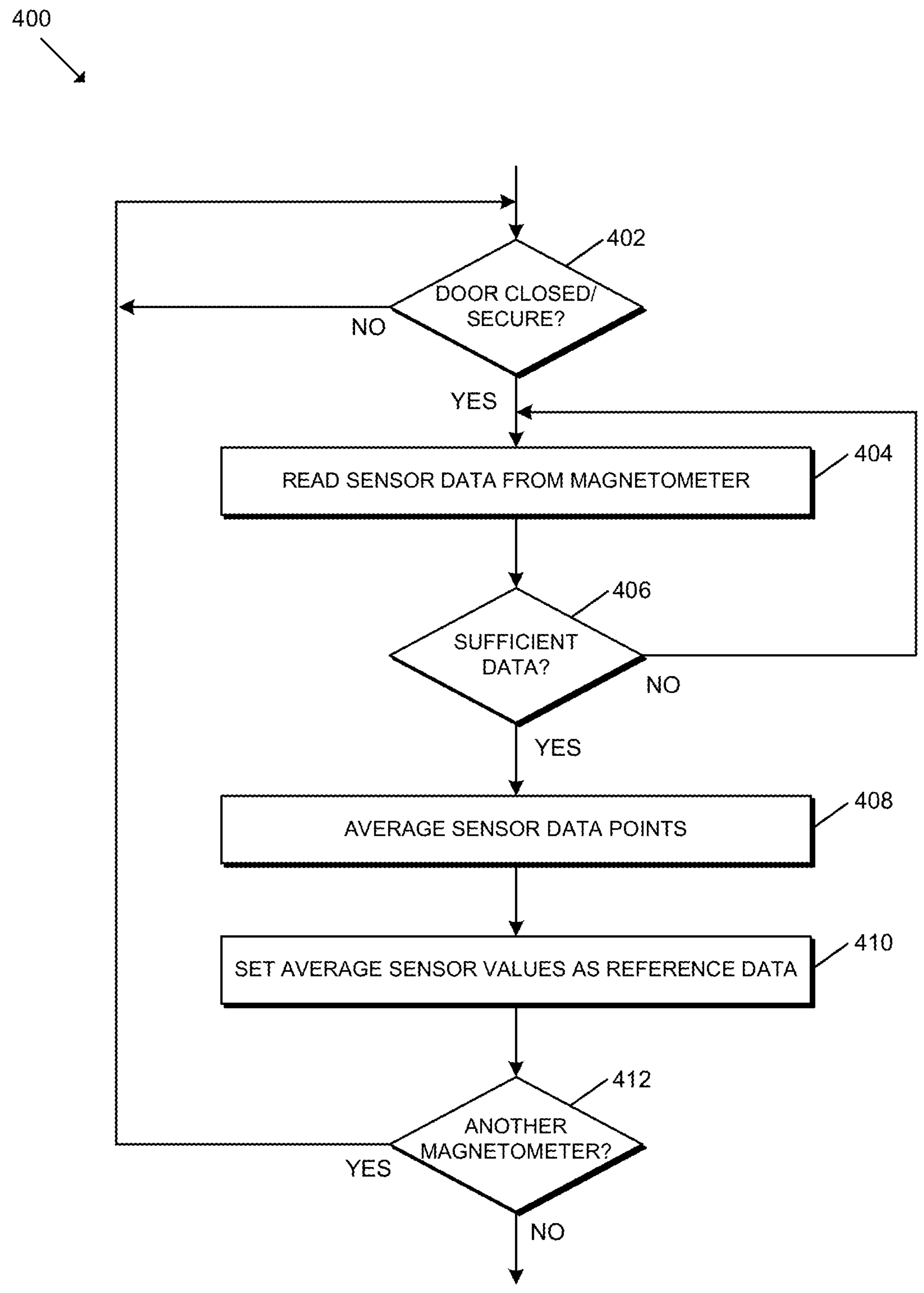
FIG. 4 is a simplified flow diagram of at least one embodiment of a method for calibrating a door position sensing system.

Referring now to FIG. 4, in use, the system 100 and/or the system 200 may execute a method 400 for calibrating a door position sensing system. It should be appreciated that the particular blocks of the method 400 are illustrated by way of example, and such blocks may be combined or divided, added or removed, and/or reordered in whole or in part depending on the particular embodiment, unless stated to the contrary. Additionally, although the method 400 may be executed by either the system 100 or the system 200, for simplicity and without loss of generality, the method 400 is described herein as being executed by the system 200. It should be appreciated that the method 400 may be executed upon new installation of one or more components of the system 200 (e.g., the access control device 202, the permanent magnet 204, etc.) and/or may be executed periodically during typical use to update the calibration.

The illustrative method 400 begins with block 402 in which the access control device 202 determines whether the door is in a closed/secure state (e.g., closed with a latch extended into a strike plate). If so, the method 400 advances to block 404 in which the access control device 202 selects one of the magnetometers 206, 208 and reads sensor data from the selected magnetometer 206, 208 (e.g., the magnetometer 206, without loss of generality). In block 406, the access control device 202 determines whether a sufficient amount of sensor data has been read from the magnetometer 206. For example, in the illustrative embodiment, the access control device 202 reads/records a sample of ten data points from the magnetometer 206. It should be appreciated that the access control device 202 may sample a different number of data point in other embodiments. The method 400 returns to block 404 until a sufficient number of data points has been read/recorded.

If and when the access control device 202 determines that a sufficient number of data points has been read/recorded, the method 400 advances to block 408 in which the access control device 202 averages the sensor data points. Further, in block 410, the access control device 202 sets the average sensor values as reference data (e.g., "home coordinates"). For example, in some embodiments, the magnetometer 206 sensor data points $<x_{i_{Ma}}, y_{i_{Ma}}, z_{i_{Ma}}>$, for i=1 . . . 10, may be averaged and set as reference data according to:

$$\langle x_{refMa}, y_{refMa}, z_{refMa}\rangle = \left\langle \frac{1}{10}\sum_{i=1}^{10} x_{iMa}, \frac{1}{10}\sum_{i=1}^{10} y_{iMa}, \frac{1}{10}\sum_{i=1}^{10} z_{iMa}\right\rangle$$

where Ma references the magnetometer 206 and $x_{i_{Ma}}$, $y_{i_{Ma}}$, and $z_{i_{Ma}}$ are the respective sensor values read from the magnetometer 206.

In block 412, the access control device 202 determines whether to calibrate another magnetometer 206, 208. If so, the method 400 returns to block 402 in which the access control device 202 confirms that the door is still in a closed and secured state and executes the method 400 as described above. For example, the access control device 202 may also execute the method 400 with respect to the magnetometer 208. Accordingly, in some embodiments, the magnetometer 208 sensor data points $<x_{i_{Mb}}, y_{i_{Mb}}, z_{i_{Mb}}>$, for i=1 . . . 10, may be averaged and set as reference data according to:

$$\langle x_{refMb}, y_{refMb}, z_{refMb}\rangle = \left\langle \frac{1}{10}\sum_{i=1}^{10} x_{iMb}, \frac{1}{10}\sum_{i=1}^{10} y_{iMb}, \frac{1}{10}\sum_{i=1}^{10} z_{iMb}\right\rangle$$

where Mb references the magnetometer 208 and $x_{i_{Mb}}$, $y_{i_{Mb}}$, and $z_{i_{Mb}}$ are the respective sensor values read from the magnetometer 208.

Although the blocks 402-412 are described in a relatively serial manner, it should be appreciated that various blocks of the method 400 may be performed in parallel in some embodiments. For example, in some embodiments, the data associated with both of the magnetometers 206, 208 may be calibrated in parallel.

Figure 5:
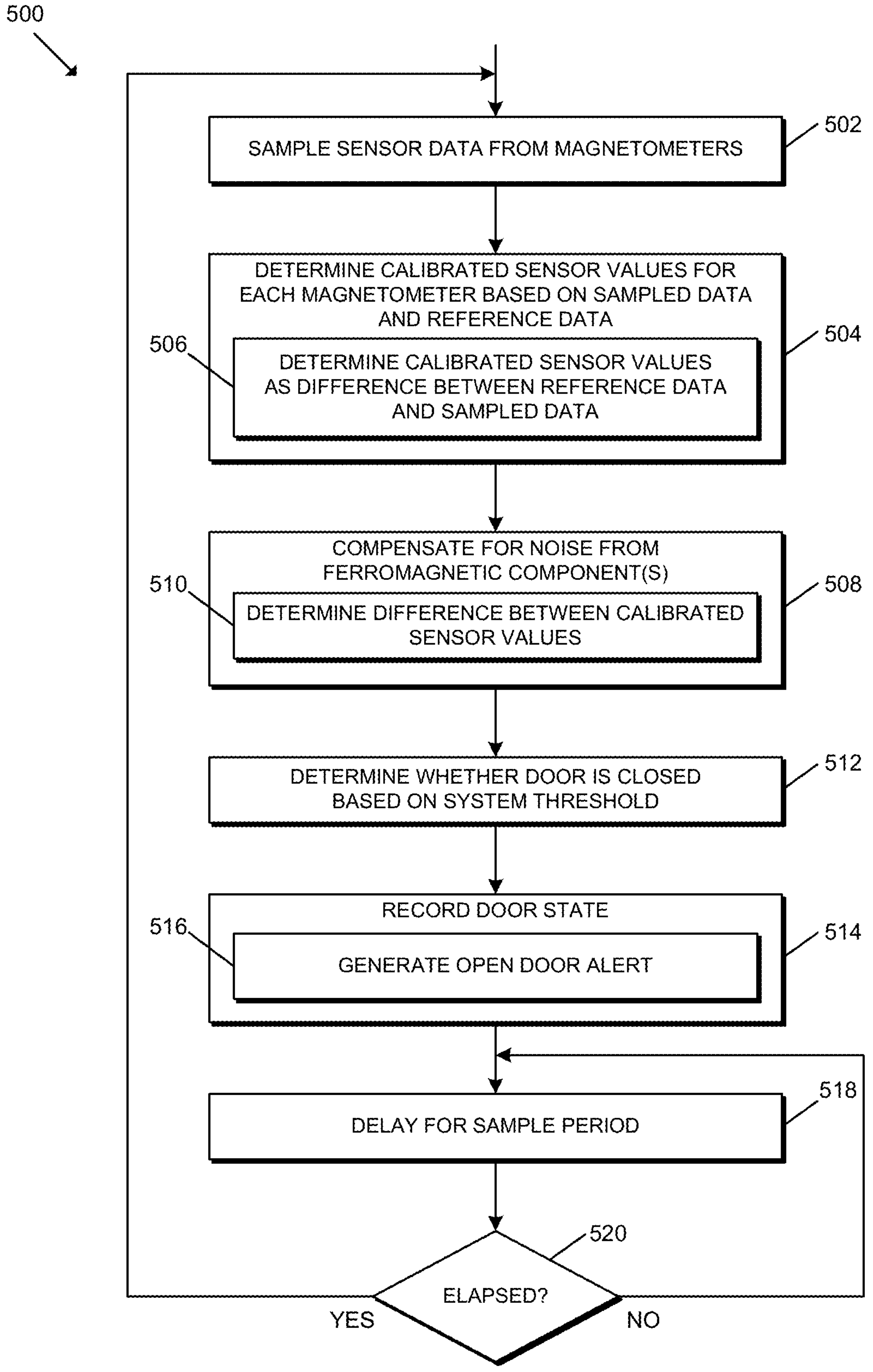
FIG. 5 is a simplified flow diagram of at least one embodiment of a method for reducing noise generated in a door position sensing system.

Referring now to FIG. 5, in use, the system 100 and/or the system 200 may execute a method 500 for reducing noise generated in a door position sensing system. It should be appreciated that the particular blocks of the method 500 are illustrated by way of example, and such blocks may be combined or divided, added or removed, and/or reordered in whole or in part depending on the particular embodiment, unless stated to the contrary. Additionally, although the method 500 may be executed by either the system 100 or the system 200, for simplicity and without loss of generality, the method 500 is described herein as being executed by the system 200. After calibration, it should be appreciated that the access control device 202 may periodically (or otherwise) execute the method 500 to determine whether the door has changed from a closed state to an open state (or otherwise determined a change of state).

The illustrative method 500 begins with block 502 in which the access control device 202 reads/samples sensor data from the magnetometers 206, 208. For example, in some embodiments, the sampled data may be denoted as $<x_{new_{Ma}}, y_{new_{Ma}}, z_{new_{Ma}}>$ for data sampled from the magnetometer 206 and as $<x_{new_{Mb}}, y_{new_{Mb}}, z_{new_{Mb}}>$ for data sampled from the magnetometer 208.

In block 504, the access control device 202 determines calibrated sensor values for each magnetometer 206, 208 based on the sampled data and the reference data determined during calibration (see, for example, the method 400 of FIG. 4). In doing so, in block 506, the access control device 202 may determine calibrated sensor values as a difference between the reference data and the sampled data. For example, in some embodiments, the calibrated sensor values ($x_{cal_{Ma}}$ and $x_{cal_{Mb}}$) may be determined according to $x_{cal_{Ma}}=x_{ref_{Ma}}-x_{new_{Ma}}$ and $x_{cal_{Mb}}=x_{ref_{Mb}}-x_{new_{Mb}}$.

In block 508, the access control device 202 compensates for noise generated by the dynamic ferromagnetic component 210. In doing so, in block 510, the access control device 202 may determine the difference between the calibrated sensor values. For example, in some embodiments, the difference $\delta_x$ may be determined according to $\delta_x=x_{cal_{Ma}}-x_{cal_{Mb}}$ and may be treated as noise-compensated sensor data.

In block 512, the access control device 202 determines whether the door is in a closed state or an open state based on the noise-compensated sensor data ($\delta_x$) and a system threshold ($\gamma_{system}$). For example, in some embodiments, the access control device 202 evaluates whether the expression $-\tau_{system}<\delta_x<\tau_{system}$ is true based on the particular noise-compensated sensor data ($\delta_x$) and system threshold ($\tau_{system}$) values. If the noise-compensated sensor data falls within the thresholds, the access control device 202 determines the door to be in a closed state. Otherwise, the door is determined to be in an open state. In the illustrative embodiment, the system threshold ($\tau_{system}$) may be determined (e.g., experimentally) based on electromagnetic properties of one or more components of the access control device 202 and predefined (e.g., in firmware) before execution of the method 500.

In block 514, the access control device 202 may record the determined door state. Further, in some embodiments, if the access control device 202 determines that the door is in an open state, the access control device 202 may generate an open door alert message in block 516. The alert message may take various forms depending on the particular embodiment. For example, in some embodiments, the alert message may be an audible and/or visual message transmitted by the access control device 202. In other embodiments, the alert message may be transmitted by the access control device 202 to one or more remote devices (e.g., via a wireless communication connection).

In block 518, the method 500 is delayed for the sample period (e.g., three seconds or another suitable period of time). If the access control device 202 determines, in block 520, that the sample period has elapsed, the method 500 returns to block 502 in which the access control device 202 samples new sensor data from the magnetometers 206, 208 to again evaluate the state of the door.

Although the blocks 502-520 are described in a relatively serial manner, it should be appreciated that various blocks of the method 500 may be performed in parallel in some embodiments.

What is claimed is:

1. An electronic lock device adapted to be secured to a door, the electronic lock device comprising:

a first magnetometer;

a second magnetometer;

a dynamic ferromagnetic component positioned between the first magnetometer and the second magnetometer;

a processor; and a memory comprising a plurality of instructions stored thereon that, in response to execution by the processor, causes the electronic lock device to:

read sensor data from the first magnetometer and the second magnetometer;

modify the sensor data to generate compensated sensor data that compensates for magnetic noise generated by the dynamic ferromagnetic component; and determine whether the door is in a closed state or an open state based on the compensated sensor data.

2. The electronic lock device of claim 1, wherein the dynamic ferromagnetic component is positioned between the first magnetometer and the second magnetometer in a first dimension; and wherein the first magnetometer is adapted to be positioned between a permanent magnet secured to a door frame and the dynamic ferromagnetic component.

3. The electronic lock device of claim 2, wherein the dynamic ferromagnetic component is adapted to rotate relative to the first dimension.

4. The electronic lock device of claim 2, wherein the dynamic ferromagnetic component is positioned between the first magnetometer and the second magnetometer along an axis.

5. The electronic lock device of claim 1, wherein the dynamic ferromagnetic component comprises at least one component of a spring cage.

6. The electronic lock device of claim 1, wherein the plurality of instructions further causes the electronic lock device to determine calibrated sensor data values based on reference data and the sensor data read from the first magnetometer and the second magnetometer; and wherein to modify the sensor data to generate the compensated sensor data comprises to generate the compensated sensor data based on the calibrated sensor data values.

7. The electronic lock device of claim 6, wherein to determine the calibrated sensor data values comprises to determine a difference between the reference data and the corresponding sensor data read from the first magnetometer and the second magnetometer.

8. The electronic lock device of claim 6, wherein to generate the compensated sensor data comprises to determine a difference between the calibrated sensor data values.

9. The electronic lock device of claim 1, wherein to determine whether the door is in the closed state or the open state comprises to determine whether the door is in the closed state or the open stated based on the compensated sensor data and at least one system threshold.

10. The electronic lock device of claim 9, wherein the at least one system threshold is based on electromagnetic properties of at least one component of the electronic lock device.

11. The electronic lock device of claim 1, wherein the plurality of instructions further causes the electronic lock device to generate an alert message in response to a determination that the door is in the open state.

12. An access control system, comprising:

a permanent magnet positioned at a door frame and structured to generate a first magnetic field; and an access control device configured to determine whether the door is in an open state or a closed state based on the first magnetic field sensed by the access control device, wherein the access control device includes:

a mechanical component having dynamic motion and adapted to generate a second magnetic field as a result of the dynamic motion;

a first sensor configured to sense magnetic fields within a vicinity of the first sensor and positioned between the permanent magnet and the mechanical component in a first dimension; and a second sensor configured to sense magnetic fields within a vicinity of the second sensor;

wherein the mechanical component is positioned between the first sensor and the second sensor in the first dimension.

13. The access control system of claim 12, wherein the first sensor is a first distance from the permanent magnet in the first dimension;

wherein the mechanical component is a second distance from the permanent magnet in the first dimension;

wherein the second sensor is a third distance from the permanent magnet in the first dimension; and wherein the second distance is greater than the first distance, and the third distance is greater than the second distance.

14. The access control system of claim 13, wherein the first sensor, the second sensor, and the mechanical component are positioned along an axis.

15. The access control system of claim 12, wherein each of the first sensor and the second sensor comprises a magnetometer.

16. The access control system of claim 12, wherein the mechanical component is adapted to rotate relative to the first dimension.

17. The access control system of claim 16, wherein the access control device comprises an electronic lock device; and wherein the mechanical component comprises a spring cage of the electronic lock device.

18. The access control system of claim 12, wherein to determine whether the door is in the open state or the closed state based on the first magnetic field sensed by the access control device comprises to compensate for the second magnetic field generated by the mechanical component.

19. The access control system of claim 12, wherein the access control device comprises a printed circuit board assembly; and wherein each of the first sensor and the second sensor is secured to the printed circuit board assembly.

20. The access control system of claim 12, further comprising a strike plate; and wherein the permanent magnet is one of secured to or integrally formed with the strike plate.

* * * * *